United States Patent
Jin et al.

(10) Patent No.: US 9,732,233 B2
(45) Date of Patent: Aug. 15, 2017

(54) COMPOSITE OPTICAL REFLECTIVE FILM AND PREPARATION METHOD THEREFOR

(71) Applicant: NINGBO SOLARTRON TECHNOLOGY CO., LTD., Ningbo (CN)

(72) Inventors: Yadong Jin, Ningbo (CN); Xiaoxi Zhu, Ningbo (CN)

(73) Assignee: Ningbo Solartron Technology Co., Ltd., Ningbo (CN)

( * ) Notice: Subject to any disclaimer, the term of this patent is extended or adjusted under 35 U.S.C. 154(b) by 0 days.

(21) Appl. No.: 14/779,907

(22) PCT Filed: Oct. 24, 2013

(86) PCT No.: PCT/CN2013/085854
§ 371 (c)(1),
(2) Date: Sep. 24, 2015

(87) PCT Pub. No.: WO2014/166225
PCT Pub. Date: Oct. 16, 2014

(65) Prior Publication Data
US 2016/0040017 A1    Feb. 11, 2016

(30) Foreign Application Priority Data
Apr. 12, 2013   (CN) .......................... 2013 1 0129691

(51) Int. Cl.
G02B 5/08       (2006.01)
G02B 7/182      (2006.01)
(Continued)

(52) U.S. Cl.
CPC ........ C09D 5/004 (2013.01); B29D 11/00788 (2013.01); C08K 3/22 (2013.01);
(Continued)

(58) Field of Classification Search
CPC ...... G02B 5/0808; G02B 5/08; G02B 5/0866; G02B 1/10; G02B 5/208; G02B 1/12;
(Continued)

(56) References Cited

U.S. PATENT DOCUMENTS

2006/0269724 A1    11/2006   Ohashi et al.
2008/0124494 A1*   5/2008    Husemann ............. C09J 7/0246
                                                             428/1.5

FOREIGN PATENT DOCUMENTS

CN    1809764 A       7/2006
CN    201636765 U    11/2010
(Continued)

Primary Examiner — Jade R Chwasz
(74) Attorney, Agent, or Firm — Weisun Rao; Greenberg Traurig, LLP

(57) ABSTRACT

The present invention provides a composite optical reflective film for a backlight source system and a preparation method therefor. The composite optical reflective film comprises a transparent diaphragm and a reflective diaphragm, wherein the reflective diaphragm is spliced to the transparent diaphragm through an adhesive, and the other face of the reflective diaphragm is coated with a reflective coating. The composite optical reflective film has good dimension stability, is not easy to warp and deform, has a higher reflectivity, has a simple preparation process and is easy to operate.

4 Claims, 1 Drawing Sheet

(51) Int. Cl.

| | |
|---|---|
| *G02B 5/26* | (2006.01) |
| *C09D 5/33* | (2006.01) |
| *G02B 1/10* | (2015.01) |
| *G02F 1/1335* | (2006.01) |
| *B29D 11/00* | (2006.01) |
| *C08K 3/22* | (2006.01) |
| *C08K 5/17* | (2006.01) |
| *C08K 5/3475* | (2006.01) |
| *C09D 123/26* | (2006.01) |
| *C09J 165/02* | (2006.01) |
| *G02B 5/20* | (2006.01) |
| *C09D 7/12* | (2006.01) |
| *B29K 101/12* | (2006.01) |
| *B29K 105/00* | (2006.01) |

(52) U.S. Cl.
CPC .............. *C08K 5/17* (2013.01); *C08K 5/3475* (2013.01); *C09D 7/1216* (2013.01); *C09D 123/26* (2013.01); *C09J 165/02* (2013.01); *G02B 1/10* (2013.01); *G02B 5/0808* (2013.01); *G02B 5/0866* (2013.01); *G02B 5/208* (2013.01); *G02F 1/133605* (2013.01); *B29K 2101/12* (2013.01); *B29K 2105/0044* (2013.01); *B29K 2995/003* (2013.01); *C08K 2003/2241* (2013.01); *C08K 2003/2296* (2013.01)

(58) Field of Classification Search
CPC ........ G02B 1/18; G02B 5/005; G02B 5/0825; G02B 5/0833; G02B 5/0841; G02B 5/0858; G02F 1/133553; G02F 1/133605; B29D 11/00596; B29D 11/00788; B29D 2995/00
USPC ................ 359/883, 884, 871, 838, 839, 900
See application file for complete search history.

(56) References Cited

FOREIGN PATENT DOCUMENTS

| | | |
|---|---|---|
| CN | 102399522 A | 4/2012 |
| CN | 102508323 A | 6/2012 |
| CN | 202421523 U | 9/2012 |
| JP | 2005114777 A | 4/2005 |
| JP | 2012121294 A | 6/2012 |

* cited by examiner

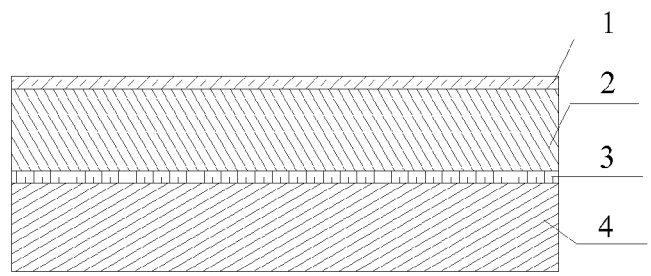

COMPOSITE OPTICAL REFLECTIVE FILM AND PREPARATION METHOD THEREFOR

CROSS-REFERENCE TO RELATED APPLICATIONS

This application is a U.S. national phase application of International Application No. PCT/CN2013/085854, filed on Oct. 24, 2013, which claims priority to Chinese Application No. 201310129691.0, filed on Apr. 12, 2013, the contents of which are incorporated herein by reference in their entireties.

TECHNICAL FIELD OF THE INVENTION

The present invention relates to the technical field of optical films, and in particular, to a composite optical reflective film for a backlight source system and a preparation method thereof.

BACKGROUND OF THE INVENTION

Liquid crystal display (LCD) technology is one of the most commonly used display technologies at present, and has dominated a prevailing technical position in the flat panel display field for a certain period. Liquid crystal molecules itself are not luminous, and images or characters displayed thereby are the results of modulating the light sent by the backlight source, and the backlight source is an important component determining the display performance of the liquid crystal display, and the brightness of the backlight source directly determines the display brightness on an LCD surface.

A liquid crystal backlight source system is primarily comprised of a light source, a light guide plate, various kinds of optical diaphragms and structural members. Its development tends towards the diversification of size and light-weighting, and requirement of high brightness. Current types of backlight sources mainly contain electro luminescence (EL), cold cathode fluorescent tube (CCFL), light emitting diode (LED), etc., which are divided into a side-light type and an end backlight type according to different positions thereof. Along with the development of the LCD modules, the side-light type CCFL backlight source of high brightness and thin thickness becomes a main stream. But due to its significant large power consumption, it cannot meet the requirements of energy conservation and a portable information product. Therefore, how to improve the backlight source brightness to further increase the LCD brightness without increasing the power consumption has become one of the main challenges of the development.

The major optical diaphragm of the liquid crystal backlight system comprises a reflective film of which the effect is to reflect light emitted from the light source at high efficiency without losses to a light emitting direction of the backlight source thus to reduce light losses and reach objects of raising brightness of the backlight or decreasing power consumption, a diffusion film and a brightness enhancement film.

How to improve the optical property of the reflective film to increase the reflectivity, making the light emitted by the light source be utilized to the highest degree, thereby reducing loss, is the important problem to be solved now in the art. Moreover, in actual applications, it is also required that the reflective film be stable in the ultraviolet resistant performance upon prolonged use; and when the temperature gradient is higher, the dimension deformation difference of the reflective film is small, and does not affect its assembly and use.

SUMMARY OF THE INVENTION

In order to overcome defects of lower reflectivity and easy deformation of the existing optical reflective film, the present invention provides a composite optical reflective film and a preparation method thereof. The composite optical reflective film of this invention has good dimension stability, is not easy to warp and deform, has a higher reflectivity, has a simple preparation process, and is easy to operate.

In order to solve the abovementioned technical problem, the present invention provides the following technical solution:

A composite optical reflective film, wherein the reflective film comprises a transparent diaphragm (or called a bottom transparent diaphragm, also known as a bottom diaphragm) and a reflective diaphragm having two sides, the reflective diaphragm is spliced on one side to the transparent diaphragm with an adhesive, and the other side of the reflective diaphragm is coated with a reflective coating; and the adhesive consists of a phenolic resin, an inorganic powder filler and a solvent. The adhesive forms an adhesive layer.

The thickness of the transparent diaphragm is 100-250 µm, and the thickness of the reflective diaphragm is 75-250 µm. Preferably, the thickness of the transparent diaphragm is 120-150 µm, 170-230 µm, 188 µm or 200 µm; and the thickness of the reflective diaphragm is 75-120 µm, 100-170 µm, 180-230 µm, 150 µm, 188 µm or 200 µm.

Furthermore, the reflective diaphragm is a white reflective diaphragm, and the reflective coating is an ultraviolet-resistant highly reflective coating. That is to say, the reflective coating has a higher reflectivity and an ultraviolet resistance function.

Furthermore, the material of the ultraviolet-resistant highly reflective coating comprises silane-crosslinked polyolefin, zinc oxide and/or titanium dioxide, and the content of zinc oxide and/or titanium dioxide is 50-70% (weight percentage).

Adding higher content of zinc oxide and titanium dioxide into the abovementioned ultraviolet-resistant highly reflective coating, can increase the reflective effect and improve the reflectivity. The weight ratio of titanium dioxide and zinc oxide is 2-4:1.

Furthermore, in the adhesive, the weight ratio of the phenolic resin, inorganic powder filler and solvent is 100:80-150:40-80.

The phenolic resin is preferably an thermosetting phenolic resin, further preferably a high ortho thermosetting phenolic resin; the inorganic powder filler (also called inorganic filler for short) is one of or a combination of at least two of zirconium powder, iron powder, carbon powder, boron powder, silicon powder, boron carbide and silicon carbide; the solvent is selected from ethyl acetate or ethanol. During the use, the adhesive (also called composite adhesive) can be prepared by adding the phenolic resin and the inorganic powder filler into the solvent and mixing them homogeneously at the room temperature. At the room temperature, the composite adhesive has higher bonding strength due to the polarity effect of the phenolic resin, and a stable structure which can keep the bonding strength thereof is formed in a high temperature environment because of the reaction between the inorganic filler and the phenolic resin. Therefore, the composite reflective film provided by the present invention can be resistant to high temperature. Due to effects of the adhesive and the dimensional stabilization of the bottom diaphragm, the reflective film is not easy to deform, so that a backlight module can also keep its dimension and stable mechanical performance in the temperature gradient environment.

The high ortho thermosetting phenolic resin can be prepared by the following method: reacting phenol with formaldehyde with the catalyst of the zinc oxide; and vacuum dehydrating them after the reaction is terminated, to provide the product when the gelling temperature of the system is 80° C., and the gelling time is 100-150 s; wherein the molar fraction ratio of the phenol, formaldehyde and zinc oxide may be 1:1.2-1.8:0.03-0.06.

Furthermore, the material of the white reflective diaphragm comprises polyethylene terephthalate (PET), and 10-25% of nano-modified inorganic fillers are homogeneously dispersed in the material; and the material of the bottom transparent diaphragm is selected from polycarbonate (PC), polypropylene (PP) or polyethylene terephthalate (PET).

The nano-modified inorganic filler comprises an inorganic particle, and an outer surface of the inorganic particle has a surface layer formed by the modified coating material. The inorganic particle is selected from one of or a combination of at least two of titanium dioxide, barium sulfate, calcium carbonate and zinc oxide, the modified cladding material is silicon dioxide and/or aluminum oxide, the weight of the coating material is 0.5-1% of the inorganic particle, and the percentage is the weight percentage. The material of the bottom transparent diaphragm is preferably PET, which has good mechanical performance, an appropriate thickness, a low hot-shrinkage rate, and good dimension stability.

Furthermore, 0.3% of the hindered amine photostabilizer and 0.3% of the benzotriazole ultraviolet absorbent are added in the ultraviolet-resistant highly reflective coating, and the percentage is the weight percentage. Utilizing the cooperative effect of the above-mentioned photostabilizer and the ultraviolet absorber reaches a highly-efficient ultraviolet resistant effect.

Furthermore, the material of the bottom transparent diaphragm is selected from PET, PP or PC; the adhesive consists of high ortho thermosetting phenolic resin, inorganic powder filler and solvent to form a composite adhesive; the ultraviolet-resistant highly reflective coating is the compound of silane-crosslinked polyolefin, titanium dioxide and zinc oxide; and the hindered amine photostabilizer and the benzotriazole ultraviolet absorbent are also added in the ultraviolet-resistant highly reflective coating.

Furthermore, the weight ratio of the high ortho thermosetting phenolic resin, inorganic powder filler and solvent in the composite adhesive is 100:80-150:40-80; the content of titanium dioxide and zinc oxide in the ultraviolet-resistant highly reflective coating is 50-70% (weight percentage). Preferably, the weight ratio of the high ortho thermosetting phenolic resin, inorganic powder filler and solvent in the composite adhesive is 100:80:40, 100:100:50, 100:120:60, or 100:150:80.

Furthermore, the materials of the bottom transparent diaphragm and white reflective diaphragm are PET, nano-modified titanium dioxide or barium sulfate are homogeneously dispersed within the white reflective diaphragm, and a modified cladding material is silica and/or alumina.

A preparation method of the above-mentioned composite optical reflective film, includes the following steps:

(1) providing a polyester base material, white masterbatch and foaming masterbatch, after crystallization and drying, to an extruder for melt plastification, and then to produce a cast sheet by filtration, tape casting and cooling;

(2) longitudinally stretching and transversely stretching the cast sheet prepared in step (1), with a stretching ratio of 3-4;

(3) applying a corona treatment on a stretched sheet prepared in step (2) when stretching, and activating the surface of the sheet to increase surface wetting tension to obtain a reflective diaphragm; and (4) cutting the reflective diaphragm prepared in step (3) into narrow reflective diaphragm, coating with an adhesive after unreeling, compositing with a bottom transparent diaphragm, coating a reflective coating on the other face of the reflective diaphragm, and drying by baking to obtain the composite optical reflective film.

The abovementioned polyester base material, white masterbatch, foaming masterbatch, and bottom transparent diaphragm can be bought in the market directly, can also be self-prepared according to demands; adding the foaming masterbatch in the reflective diaphragm can improve the reflectivity thereof, reduce the diaphragm density and reduce the cost simultaneously; and the reflective coating materials and adhesive can also be self-prepared according to the raw material ratio.

Compared with the prior art, the reflective diaphragm and bottom diaphragm of the reflective film provided by the present invention have excellent dimension stability, even if at high temperature or under larger temperature gradient, the warping deformation will not occur on the diaphragm; and its ultraviolet-resistant highly reflective coating has an excellent ultraviolet resistant effect, and a high content of inorganic particles in the reflective coating can improve the reflectivity of the diaphragm, can also improve the brilliance of the backlight module assembled from the composite reflective film simultaneously. The preparation method of the reflective film is simple to process and easy to operate.

BRIEF DESCRIPTION OF THE DRAWING

FIG. 1 is a structural diagram of a composite optical reflective film provided by the present invention, wherein 1 represents an ultraviolet-resistant highly reflective coating, 2 represents a white reflective diaphragm, 3 represents an adhesive layer, and 4 represents a bottom transparent diaphragm.

DETAILED DESCRIPTION OF THE INVENTION

As shown in FIG. 1, the present invention provides a composite optical reflective film, including a bottom transparent diaphragm 4 which is provided with a white reflective diaphragm 2 on one side thereof, wherein the white reflective diaphragm 2 is coated with an ultraviolet-resistant highly reflective coating 1 on one side and composited with the bottom transparent diaphragm 4 via an adhesive on another side, and the adhesive forms an adhesive layer 3.

A method for preparing the composite optical reflective film of this invention comprises the following steps:

(1) providing a polyester base material, white masterbatch and foaming masterbatch, after crystallization and drying, to a single-screw extruder or a twin-screw extruder for melt plastification; after passing through a melt pipe filter, tape casting onto a chill roller through a clothes-hanger type long slot die; quickly cooling the polyester melt below a glass transition temperature on the chill roller with uniform rotation, to form a cast sheet with the uniform thickness in a glassy state;

(2) longitudinally stretching the cast sheet prepared in step (1) in a heated state by a longitudinal stretching machine with a stretching ratio of 3-4; and then entering into a transverse-stretch oven to stretch the cast sheet in a width direction with a ratio consistent with the longitudinal stretching ratio;

(3) applying a corona treatment on a stretched sheet prepared in step (2) during stretching, and activating the surface of the sheet, to increase surface wetting tension to obtain a reflective diaphragm; and (4) cutting the reflective diaphragm prepared in step (3) into narrow reflective diaphragm, coating with an adhesive after unreeling, compositing with a bottom transparent diaphragm, coating a reflective coating on the other face of the reflective diaphragm, and drying by baking to obtain the final product (the composite optical reflective film).

The following methods are used to test performances of the composite optical reflective films:

Reflectivity: the higher the reflectivity of the film, the better the performance, a ColorQuest XE spectrophotometer produced by Hunterlab Company is adopted to test its reflectivity by an integrating sphere d/8° structure under a D65 light source condition, the reflectivity data is the weighted average value of the reflectivity of every wavelength with the interval of 10 nm at 400-700 nm, and the weighted value corresponds to an energy distribution curve of the D65 light source.

Luminance: the diaphragm is assembled respectively in a direct type and side entrance type backlight modules of 31.5 inches, and the luminance test is carried out by instrument BM-7A luminance photometer of Japan Topcon Corporation, the manufacturer of the test platform is Suzhou Fstar Scientific Instrument Co., Ltd., the model is FS-5500G, and the average luminance value for 9 points is tested under 1° of the viewing angle in 500 mm distance when the backlight is normally lighted; and three diaphragms are taken in each test, and the average value is taken after the luminance tests.

The smoothness of the film: (1) one sheet of film is cut apart to be placed on horizontal glass, and it will be suitably attached to the glass and no waviness will be seen if the smoothness is good; (2) the film is cut apart along a central axis thereof, and no gap will be observed when the two halves of films are placed against each other if the smoothness is good; and (3) the film is unfolded after winding for a period of time, and it will not be warped or crimped.

Warpage: the warpage test is carried out on the final product of film according to the GBT 25257-2010 optical functional film warpage measuring method. Three pieces of samples of A4-size are chosen for each sample to carry out the warpage test, the samples are placed on a smooth glass testing platform, and the maximum warpage height is tested by a steel ruler.

The present invention are further described in details with reference to the specific embodiments below, Tinuvin770, Tinuvin622, Tinuvin744 of Switzerland Ciba-Geigy Company or Sanol770, Sanol744 of Japan Sankyo Chemical Company and the like can be selected as the hindered amine photostabilizers (HALS) in the embodiments, and UV326, UV327, UV328, UV329 and the like can be selected as benzotriazole ultraviolet absorbers.

Example 1

A composite optical reflective film of the present invention comprised a bottom transparent diaphragm provided with a white reflective diaphragm on one side thereof, the white reflective diaphragm was coated with an ultraviolet-resistant highly reflective coating on one side and composited with the bottom transparent diaphragm by an adhesive on the other side, and an adhesive formed the adhesive layer.

The material of the bottom transparent diaphragm was hyperviscous PET (namely the PET hyperviscous material) with a thickness of 120 μm, and the thickness of the reflective diaphragm was 100 μm; the adhesive was a compound of the high ortho thermosetting phenol resin, inorganic zirconium-borosilicon powders (zirconium powders, boron powders and silicon powders were mixed according to a weight ratio of 3:1:1) and ethanol solvent, with a weight ratio of 100:120:60; the ultraviolet-resistant highly reflective coating was a compound of silane-crosslinked polyolefin, titanium dioxide and zinc oxide with a content of 50% of titanium dioxide and zinc oxide; and the ultraviolet-resistant highly reflective coating was also added with 0.3% of the hindered amine photostabilizer and 0.3% of the benzotriazole ultraviolet absorber.

Example 2

A composite optical reflective film of the present invention comprised a bottom transparent diaphragm provided with a white reflective diaphragm on one side thereof, the white reflective diaphragm was coated with an ultraviolet-resistant highly reflective coating on one side and composited with the bottom transparent diaphragm by the adhesive on the other side, and the adhesive formed the adhesive layer.

The material of the bottom transparent diaphragm was PC with a thickness of 170 μm, and the reflective diaphragm had a thickness of 120 μm; the adhesive was a compound of the high ortho thermosetting phenol resin, inorganic zirconium borosilicate powders (zirconium powders, boron powders, silica powders were mixed according to a weight ratio of 3:1:1) and an ethyl acetate solvent, with the weight ratio of 100:80:40; the ultraviolet-resistant highly reflective coating was a compound of silane-crosslinked polyolefin, titanium dioxide and zinc oxide, with the content of 60% of titanium dioxide and zinc oxide; and the ultraviolet-resistant highly reflective coating was also added with 0.3% of the hindered amine photostabilizer and 0.3% of the benzotriazole ultraviolet absorber.

Example 3

A composite optical reflective film of the present invention comprised a bottom transparent diaphragm provided with a white reflective diaphragm on one side thereof, the white reflective diaphragm was coated with an ultraviolet-resistant highly reflective coating on one side and composited with the bottom transparent diaphragm by an adhesive on the other side, and the adhesive formed adhesive layer.

The material of the bottom transparent diaphragm was PP with a thickness of 230 μm, and the thickness of the reflective diaphragm was 200 μm; the adhesive consisted of the high ortho thermosetting phenol resin, inorganic zirconium-borosilicon powders (zirconium powders, boron powders and silicon powders were mixed according to a weight ratio of 3:1:1) and ethyl acetate solvent, with a weight ratio of 100:150:80; the ultraviolet-resistant highly reflective coating was a compound of silane-crosslinked polyolefin, titanium dioxide and zinc oxide with a content of 70% of titanium dioxide and zinc oxide; and the ultraviolet-resistant highly reflective coating was also added with 0.3% of the hindered amine photostabilizer and 0.3% of the benzotriazole ultraviolet absorber.

Example 4

A composite optical reflective film of the present invention was also provided, wherein the reflective film comprised a transparent diaphragm and a reflective diaphragm, the reflective diaphragm was spliced to the transparent diaphragm through an adhesive, and the adhesive formed adhesive layer. The other face of the reflective diaphragm was coated with a reflective coating.

The material of the bottom transparent diaphragm was PC with a thickness of 100 μm, and the thickness of the reflective diaphragm was 75 μm; the adhesive was a compound of the high ortho thermosetting phenol resin, iron powders and ethyl acetate solvent, with a weight ratio of 100:150:80; the ultraviolet-resistant highly reflective coating was a compound of silane-crosslinked polyolefin, titanium dioxide and zinc oxide with a content of 60% of titanium dioxide and zinc oxide (the weight ratio of the titanium dioxide and zinc oxide was 2:1); and the ultraviolet-resistant highly reflective coating was also added with 0.3% of the hindered amine photostabilizer and 0.3% of the benzotriazole ultraviolet absorber.

Example 5

A composite optical reflective film comprised a transparent diaphragm and a white reflective diaphragm, the white reflective diaphragm was spliced to the transparent diaphragm through an adhesive, the adhesive formed adhesive layer, and the other face of the reflective diaphragm was coated with a reflective coating.

The material of the bottom transparent diaphragm was PP with a thickness of 250 μm, and the thickness of the reflective diaphragm was 250 μm; the adhesive was a compound of the high ortho thermosetting phenol resin, boron carbide, and silicon carbide (boron carbide and silicon carbide were mixed according to a weight ratio of 2:1) and ethanol solvent, with a weight ratio of 100:120:60; the ultraviolet-resistant highly reflective coating was a compound of silane-crosslinked polyolefin, titanium dioxide and zinc oxide with a content of 50% of titanium dioxide and zinc oxide (the weight ratio of titanium dioxide and zinc oxide was 3:1); and the ultraviolet-resistant highly reflective coating was also added with 0.3% of the hindered amine photostabilizer and 0.3% of the benzotriazole ultraviolet absorber.

Example 6

A composite optical reflective film comprised a transparent diaphragm and a white reflective diaphragm, the white reflective diaphragm was spliced to the transparent diaphragm through an adhesive, and the other face of the reflective diaphragm was coated with an ultraviolet-resistant highly reflective coating.

The material of the bottom transparent diaphragm was PET with a thickness of 150 μm, and the thickness of the reflective diaphragm was 150 μm; the adhesive was a compound of the high ortho thermosetting phenol resin, carbon powders and silicon powders (carbon powders and silicon powders were mixed according to a weight ratio of 3:1) and ethanol solvent, with a weight ratio of 100:80:40; the ultraviolet-resistant highly reflective coating was a compound of silane-crosslinked polyolefin, titanium dioxide and zinc oxide with a content of 50% of titanium dioxide and zinc oxide (the weight ratio of titanium dioxide and zinc oxide was 4:1); and the ultraviolet-resistant highly reflective coating was also added with 0.3% of the hindered amine photostabilizer and 0.3% of the benzotriazole ultraviolet absorber.

Example 7

A composite optical reflective film comprised a bottom transparent diaphragm and a white reflective diaphragm, the white reflective diaphragm was composited with the bottom transparent diaphragm through an adhesive, and the other face of the white reflective diaphragm was coated with an ultraviolet-resistant highly reflective coating.

The material of the bottom transparent diaphragm was PET with a thickness of 170 μm, and the thickness of the reflective diaphragm was 180 μm; the adhesive consisted of the thermosetting phenol resin, inorganic zirconium-borosilicon powders (zirconium powders, boron powders and silicon powders were mixed according to a weight ratio of 3:1:1) and ethyl acetate solvent, with a weight ratio of 100:100:50; the white reflective diaphragm had 10% of nano-modified titanium dioxide homogeneously dispersed therein, the surface modified cladding material of titanium dioxide was a mixture of silicon dioxide and aluminum oxide, and the weight of the cladding material was 1% of titanium dioxide; the ultraviolet-resistant highly reflective coating was a compound of silane-crosslinked polyolefin, titanium dioxide and zinc oxide with a content of 50% of titanium dioxide and zinc oxide; and the ultraviolet-resistant highly reflective coating was also added with the hindered amine photostabilizer and the benzotriazole ultraviolet absorber.

Example 8

A composite optical reflective film comprised a bottom transparent diaphragm and a white reflective diaphragm, the white reflective diaphragm was composited with the bottom transparent diaphragm through an adhesive, the other face of the white reflective diaphragm was coated with an ultraviolet-resistant highly reflective coating, and the adhesive formed adhesive layer.

The material of the bottom transparent diaphragm was PP with a thickness of 200 μm, and the thickness of the reflective diaphragm was 230 μm; the adhesive consisted of the high ortho thermosetting phenol resin, inorganic zirconium-borosilicon powders (zirconium powders, boron powders and silicon powders were mixed according to a weight ratio of 3:1:1) and ethyl acetate solvent, with a weight ratio of 100:80:80; the white reflective diaphragm had 25% of nano-modified barium sulfate homogeneously dispersed therein, the modified cladding material of barium sulfate was aluminum oxide, and the weight of the cladding material was 0.5% of barium sulfate; the ultraviolet-resistant highly reflective coating was a compound of silane-crosslinked polyolefin, titanium dioxide and zinc oxide with a content of 60% of titanium dioxide and zinc oxide; and the ultraviolet-resistant highly reflective coating was also added with the hindered amine photostabilizer and the benzotriazole ultraviolet absorber.

Example 9

A composite optical reflective film comprised a bottom transparent diaphragm and a white reflective diaphragm, the white reflective diaphragm was composited with the bottom transparent diaphragm through an adhesive, the other face of the white reflective diaphragm was coated with an ultraviolet-resistant highly reflective coating, and the adhesive formed adhesive layer.

The material of the bottom transparent diaphragm was PC with a thickness of 188 μm, and the thickness of the reflective diaphragm was 188 μm; the adhesive consisted of the high ortho thermosetting phenol resin, inorganic zirconium-borosilicon powders (zirconium powders, boron powders and silicon powders were mixed according to a weight ratio of 3:1:1) and ethyl acetate solvent, with a weight ratio of 100:150:60; the white reflective diaphragm had 15% of nano-modified calcium carbonate homogeneously dispersed therein, and the modified cladding material of calcium carbonate was silicon dioxide; the ultraviolet-resistant highly reflective coating was a compound of silane-crosslinked polyolefin, titanium dioxide and zinc oxide with a content of 70% of titanium dioxide and zinc oxide; and the ultraviolet-resistant highly reflective coating was also added with the hindered amine photostabilizer and the benzotriazole ultraviolet absorber.

Comparative Example 1

The composite optical reflective film was prepared according to the abovementioned method, the material of the bottom transparent diaphragm was PET with a thickness of 188 μm, and the thickness of the reflective diaphragm was 188 μm; the adhesive was epoxy resin; the white reflective diaphragm had nano-modified titanium dioxide homogeneously dispersed therein, and the modified cladding material of titanium dioxide was silicon dioxide and aluminum oxide; the ultraviolet-resistant highly reflective coating was a compound of silane-crosslinked polyolefin, titanium dioxide and zinc oxide with a content of 50% of titanium dioxide and zinc oxide; and the ultraviolet-resistant highly reflective coating was also added with the hindered amine photostabilizer and the benzotriazole ultraviolet absorber.

The composite optical reflective film selected an ordinary adhesive for usage, which had poor dimension stability. The performance test result is included in Table 1.

Comparative Example 2

The composite optical reflective film was prepared according to the abovementioned method, the material of the bottom transparent diaphragm was PET with a thickness of 188 μm, and the thickness of the reflective diaphragm was 188 μm; the adhesive consisted of the high ortho thermosetting phenol resin, borosilicon powders and ethyl acetate solvent, with a weight ratio of 100:100:50; the white reflective diaphragm had nano-modified titanium dioxide homogeneously dispersed therein, and the modified cladding material was silicon dioxide and aluminum oxide; the ultraviolet-resistant highly reflective coating was a compound of silane-crosslinked polyolefin, titanium dioxide and zinc oxide with a content of 30% of titanium dioxide and zinc oxide; and the ultraviolet-resistant highly reflective coating was also added with the hindered amine photostabilizer and the benzotriazole ultraviolet absorber.

The content of titanium dioxide and zinc oxide in the ultraviolet-resistant highly reflective coating of the reflective film was lower, and the reflective effect was poor. The performance test result is included in Table 1.

Comparative Example 3

The E6D6 type reflective film was produced by Toray Company in Japan.

TABLE 1

Performance test table of the composite optical reflective film provided by the examples and the comparative examples of the present invention:

| Reflective film | Reflectivity | Warpage | Side entering average luminance (cd/m$^2$) | Direct average luminance (cd/m$^2$) |
|---|---|---|---|---|
| Example 1 | 98.5% | 1.4 mm | 4865 | 2675 |
| Example 2 | 99.1% | 0.8 mm | 4923 | 2720 |
| Example 3 | 99.7% | 0.8 mm | 4990 | 2787 |
| Example 4 | 99.1% | 0.8 mm | 4919 | 2722 |
| Example 5 | 98.5% | 1.2 mm | 4866 | 2667 |
| Example 6 | 98.6% | 1.2 mm | 4865 | 2680 |
| Example 7 | 98.4% | 0.9 mm | 4868 | 2669 |
| Example 8 | 99.2% | 0.8 mm | 4930 | 2718 |
| Example 9 | 99.7% | 0.9 mm | 4987 | 2779 |
| Comparative example 1 | 98.4% | 2.0 mm | 4866 | 2677 |
| Comparative example 2 | 97.8% | 1.0 mm | 4823 | 2612 |
| Comparative example 3 | 96.5% | 1.9 mm | 4850 | 2612 |

According to the performance test results of the reflective film in Table 1, it might be concluded that the composite optical reflective film provided by the present invention had higher reflectivity with respect to the reflective film provided by the comparative examples; according to the warpage data of comparative example 1 and comparative example 3, it might be concluded that the smoothness of the reflective film provided by the present invention was better and the warpage data was lower; and comparative example 2 used the adhesive provided by the present invention, therefore the warpage data was also lower. In the aspect of luminance, as the reflective film had been developed up to now, the improvement space for luminance was very little, and generally, improving by 2-3% was a very significant improvement. The luminance of the composite optical reflective film provided by the embodiments 1 to 9 of the present application ranged from 2667 to 2787, with the average value of 2713, which, compared with the luminance value of the reflective film provided by the comparative example 2 and comparative example 3, was improved by 3.8%. Compared with the technical solution recited in the present application, the technical solution provided by comparative example 1 just used different adhesives, so the luminance value was not obviously reduced, but the warpage data was higher. Accordingly, the composite optical reflective film provided by the present invention had better overall performances.

The above described is just the preferable embodiments of the present invention and is not intended to limit the protection scope of the present invention. All equivalent alterations and modifications made according to the present invention will fall within the scope of the claims of the present invention.

What is claimed is:

1. A composite optical reflective film comprising a transparent diaphragm and a white reflective diaphragm having two sides, wherein
    the reflective diaphragm is adhered on one side to the transparent diaphragm with an adhesive and coated on the other side with an ultraviolet-resistant highly reflective coating;
    the ultraviolet-resistant highly reflective coating comprises silane-crosslinked polyolefin, zinc oxide and/or titanium dioxide, wherein zinc oxide and/or titanium dioxide in the coating is 50-70% (weight percentage);

and the ultraviolet-resistant highly reflective coating is also added with 0.3% of a hindered amine photostabilizer and 0.3% of a benzotriazole ultraviolet absorber, in which the percentage is the weight percentage; and the adhesive consists of a phenolic resin, an inorganic powder filler, and a solvent.

2. A composite optical reflective film comprising a transparent diaphragm and a white reflective diaphragm having two sides, wherein
- the transparent diaphragm is made of material selected from polyethylene terephthalate (PET), polypropylene (PP) or polycarbonate (PC);
- the reflective diaphragm is adhered on one side to the transparent diaphragm with an adhesive and coated on the other side with an ultraviolet-resistant highly reflective coating;
- the ultraviolet-resistant highly reflective coating is a complex of the silane-crosslinked polyolefin, titanium dioxide and zinc oxide, wherein zinc oxide and titanium dioxide constitute 50-70% of the coating (weight percentage); and the ultraviolet-resistant highly reflective coating is also added with a hindered amine photostabilizer and a benzotriazole ultraviolet absorber; and
- the adhesive consists of a phenolic resin, an inorganic powder filler, and a solvent; the phenolic resin in the adhesive is a high ortho thermosetting phenolic resin, and the adhesive is a composite adhesive.

3. The composite optical reflective film according to claim 2, wherein in the composite adhesive, the weight ratio of the high ortho thermosetting phenolic resin, inorganic powder filler and solvent is 100:80-150:40-80.

4. A method for preparing the composite optical reflective film according to any of claims 1 to 3, wherein the method comprises the following steps:
(1) crystallizing and drying a polyester base material, white masterbatch and foaming masterbatch, and then feeding same into an extruder for melt plastification, thereby producing a cast sheet by filtration, tape casting and cooling;
(2) longitudinally stretching and transversely stretching the cast sheet manufactured in step (1), with a stretching ratio of 3-4;
(3) performing a corona treatment on the stretched sheet prepared in step (2) during stretching, and activating the surface of the sheet to increase surface wetting tension, thereby obtain a reflective sheet; and
(4) cutting the reflective sheet prepared in step (3) into narrow reflective diaphragm, coating the reflective diaphragm with an adhesive after unreeling, compositing the reflective diaphragm on one of its two surfaces with a transparent diaphragm, coating a reflective coating on the other face of the reflective diaphragm, and drying by baking to obtain the composite optical reflective film.

* * * * *